United States Patent [19]
Johnston

[11] 3,866,114
[45] Feb. 11, 1975

[54] ELECTROSTATIC MEASUREMENT SYSTEM

[75] Inventor: James E. Johnston, Huntsville, Ala.

[73] Assignee: The United States of America as represented by the Administrator of the National Aeronautics and Space Administration, Washington, D.C.

[22] Filed: June 15, 1973

[21] Appl. No.: 370,255

[52] U.S. Cl. .................................. 324/32, 324/54
[51] Int. Cl. ...................... G01r 5/28, G01r 31/12
[58] Field of Search ....... 324/32, 72, 29, 109, 71 R, 324/54

[56] References Cited
UNITED STATES PATENTS

| | | | |
|---|---|---|---|
| 3,234,462 | 2/1966 | Holdsworth | 324/32 X |
| 3,358,378 | 12/1967 | Downs | 324/32 X |

OTHER PUBLICATIONS

Inculet, I. "Static Electrification of Dielectrics . . ." Electrostatics and its Applications, John Wiley & Sons, N.Y., 1973, Chapter 5, pp. 86–114.
D. K. Donald, "Contact Electrification of Insulators and its Relevance to Electrets," J. Electrochem. Soc., Vol. 115, No. 3, March 1968, pp. 270–272.
D. K. Davies, "Charge Generation on Dielectric Surface" Brit. J. Appl. Phys., Ser. 2, Vol. 2, 1969, pp. 1533–37.

Primary Examiner—Alfred E. Smith
Assistant Examiner—Rolf Hille
Attorney, Agent, or Firm—George J. Porter; L. D. Wofford, Jr.; John R. Manning

[57] ABSTRACT

A system for and method of contact electrifying a dielectric to determine its electrostatic properties. The dielectric is placed in contact with a contact plate means which is then connected to a voltage source means to charge the contact plate and contact electrify the dielectric. The contact plate means is then disconnected from the voltage source and a charge sensor means monitors the rate of decay of the charge on the dielectric. If a conductive path from the contact plate to ground is desired, a lead may be connected between the conductor and ground. Automatic timing and charge monitoring are preferred for maximum accuracy, especially where dielectrics which have been treated with antistatic agents are being tested.

2 Claims, 1 Drawing Figure

PATENTED FEB 11 1975　　　　　　　　3,866,114
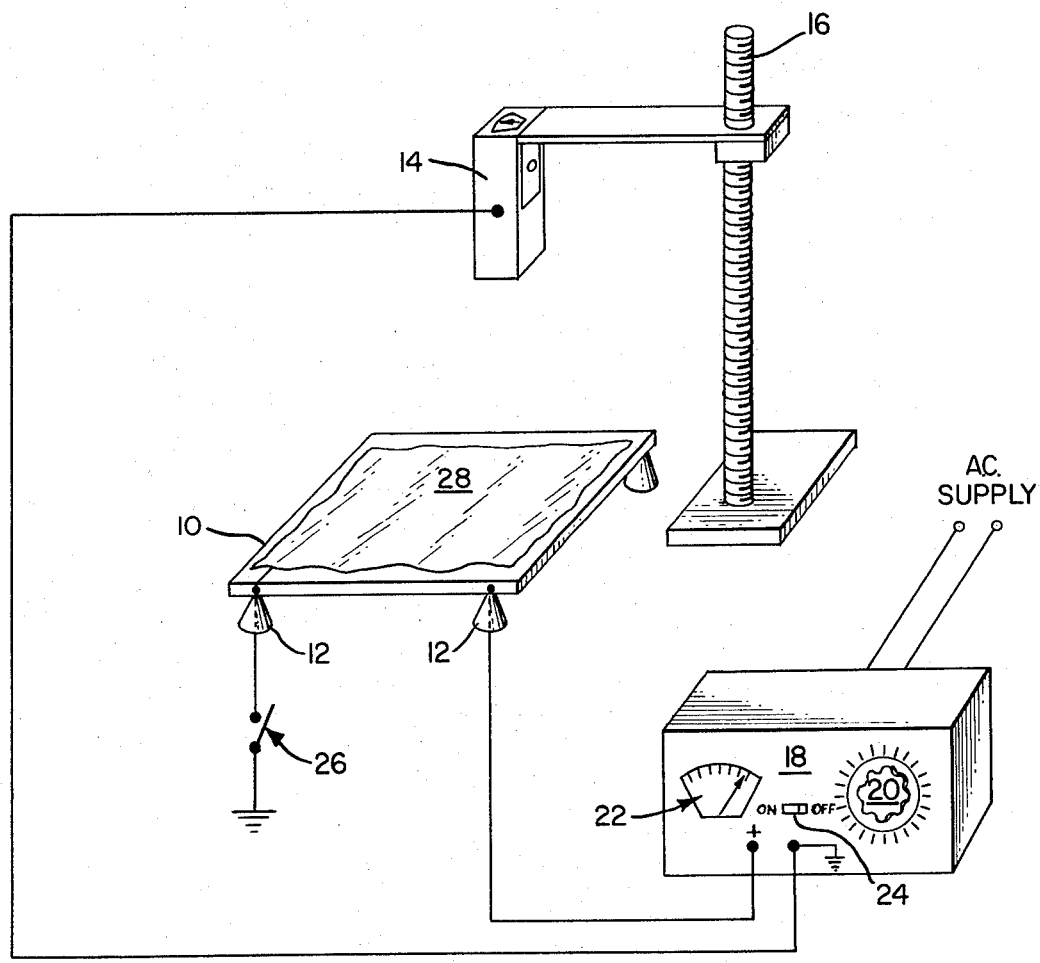

ELECTROSTATIC MEASUREMENT SYSTEM

The invention described herein was made by an employee of the United States Government and may be manufactured and used by or for the Government for governmental purposes without the payment of any royalties thereon or thereunder.

BACKGROUND OF THE INVENTION

1. FIELD OF THE INVENTION

The invention relates to the field of electrical characteristic testing and more particularly to the field of testing the electrostatic properties of dielectrics.

2. PRIOR ART

Prior art electrostatic measurement systems employ various techniques for charging the material whose characteristics are to be determined. One of these techniques involves rubbing the surface of the material being tested to establish a static charge as a result of the triboelectric effect. This method suffers from several disadvantages; among them are the difficulty of applying uniform pressure during the rubbing and the time delay from the end of the rubbing until the material under test is placed under an electrostatic field meter and measurement of the charge decay rate begins. A second method of charging the dielectric involves connecting a d.c. voltage across the dielectric and allowing the dielectric to charge by conduction. The primary disadvantage of charging the dielectric by conduction is that the sample may take a long time to charge.

OBJECTS

A primary object of the instant invention is to test the electrostatic properties of materials with accurately repeatable charge conditions.

Another primary object is to test the electrostatic properties of materials with minimum decay of the applied charge before the measurement begins.

SUMMARY

The invention achieves the above objects by providing contact plate means positioned under a charge sensor means and connected to a voltage source means. The material to be tested is placed on the contact plate and a test voltage is applied between the plate and a ground reference. This causes charge to collect on the plate and contact electrifies the material to be tested. The charge sensor may be activated while the voltage supply is impressing the test voltage on conducting plate. The voltage supply is then disconnected from the contact plate — preferably by a switch. Since the sensor is already activated, a continuous measurement of the charge decay may be obtained, with no delay between the charging of the material under test and the beginning of the measurement. The preferred charge sensor is an electric field meter. For optimum performance, the dielectric material to be measured must be thin enough that electrification occurs immediately by contact and not so thick that electrification occurs by vertical conduction. Also, the contact plate must be large enough that it will not act as a small area electrode requiring horizontal conduction throughout the material to achieve electrification.

BRIEF DESCRIPTION OF THE DRAWING

The single drawing FIGURE is a stylized perspective of the apparatus of the invention.

DESCRIPTION OF THE PREFERRED EMBODIMENT

As illustrated in the FIGURE, the preferred embodiment of the invention comprises contact plate means 10 supported by four insulating rubber corks 12; charge sensor means 14 positioned above the contact plate and voltage supply means 18. The contact plate comprises a conductor material having a substantial area for contacting a dielectric. The contact plate is preferably planar, but may be made curved if desired. The plate is preferable about 25 cm. square and connected to a positive high voltage d.c. output terminal of voltage supply means 18, which preferably has an adjustable output level. The charge sensor means 14 preferably comprises an electric field meter having a conducting case connected to the ground terminal of supply 18. The field meter is preferably positioned about 5 cm. above the contact plate in order to restrict it to measuring the field from the material under test. A grounding switch 26 is connected to plate 10 for connecting the plate to ground. A sheet 28 of material to be tested is shown lying on plate 10, ready for contact electrification.

OPERATION OF THE PREFERRED EMBODIMENT

To test the electrostatic properties of a sheet of material, a piece of the material is placed on plate 10 so that it covers most of the plate. If voltage supply 18 is not preset, it is adjusted to the desired test voltage preferably about 5,000 volts. Supply 18 is then connected to plate 10 by turning switch 24 on. If electric field meter 14 is not already activated, it is preferably activated at this time to begin monitoring the electric field between the material under test and the meter casing. Once the material under test has been contact electrified by the capacitive effect of conductive plate 10 and the meter casing, the measurement of the material properties may proceed. The test voltage is disconnected from plate 10 by turning switch 24 off. The static charge can dissipate only by radiation, since there is no conductive path to ground. With materials on which the electrostatic charge dissipates slowly, a stop watch can be used to time the charge decay. With materials on which the charge dissipates rapidly, such as those treated with antistatic agents, electronic recording of the field versus time is preferred to obtain accurate data.

When a measurement is finished, grounding switch 26 is closed to discharge plate 10.

This test system provides several advantages over prior art test systems. First it provides repeatable test values which make accurate comparison of different materials possible. Second, since there is no delay between charging the material under test and the beginning of the measurement, accurate measurements may be performed even on materials which dissipate charge very rapidly. Third, the system's accurate measurements on rapid charge dissipation materials make accurate comparison testing of antistatic agents feasible.

Despite the high test voltages employed, there need be little danger to the operator because the voltage source can readily be limited to a maximum current of 5 ma and very little charge is stored on the small contact plate 10.

I claim:

1. A method of measuring the electrostatic properties of a dielectric comprising the steps of:

a. providing a sheet of the dielectric thin enough so that electrification can occur immediately by contact as distinguished from electrification by transverse conduction;

b. placing the sheet in contact with a contact plate located in proximity to a grounded electric field meter;

c. applying a D.C. potential to the plate for raising the potential of the plate relative to ground thereby contact-electrifying the sheet and establishing an electric field between the sheet and the meter; and d. disconnecting the plate from ground and thereafter monitoring the meter to determine the time rate of change of the electric field.

2. Apparatus for use in determining the electrostatic properties of a dielectric, comprising:

a. a contact plate insulated from electrical ground for contacting and supporting a sheet of dielectric to be tested;

b. a D.C. potential source;

c. a two-state selectively operable switch;

d. means interconnecting the plate, the potential source, the electrical ground and the switch so that in its first state, the switch holds the plate at a fixed potential relative to the electrical ground, and in the second state of the switch, the plate is disconnected from the electrical ground; and e. an electric field meter connected to the electrical ground and spaced from the plate for measuring the electric field strength between the plate and the electrical ground when the switch is in its second state.

* * * * *